US012800483B2

(12) United States Patent
Bothschafter et al.

(10) Patent No.: US 12,800,483 B2
(45) Date of Patent: Nov. 17, 2026

(54) COLORIMETRY METHOD AND SYSTEM

(71) Applicant: Instrument Systems GmbH, Munich (DE)

(72) Inventors: Elisabeth Bothschafter, Munich (DE); Ferdinand Deger, Munich (DE); Markus Estermann, Babensham (DE); Reto Häring, Munich (DE); Christoph Kappel, Aschheim (DE); Jürgen Neumeier, Rauenberg (DE); Roland Schanz, Munich (DE); Christof Thalhammer, Munich (DE)

(73) Assignee: Instrument Systems GmbH, Munich (DE)

( * ) Notice: Subject to any disclaimer, the term of this patent is extended or adjusted under 35 U.S.C. 154(b) by 118 days.

(21) Appl. No.: 18/751,514

(22) Filed: Jun. 24, 2024

(65) Prior Publication Data

US 2024/0344975 A1 Oct. 17, 2024

Related U.S. Application Data

(63) Continuation of application No. PCT/EP2022/087564, filed on Dec. 22, 2022.

(30) Foreign Application Priority Data

Dec. 23, 2021 (DE) ..................... 10 2021 134 569.3

(51) Int. Cl.
*G01N 21/25* (2006.01)
*G01N 21/31* (2006.01)
*G06T 7/90* (2017.01)

(52) U.S. Cl.
CPC ........... *G01N 21/31* (2013.01); *G01N 21/251* (2013.01); *G06T 7/90* (2017.01); *G01N 2201/06* (2013.01);
(Continued)

(58) Field of Classification Search
CPC .. G01N 21/31; G01N 21/251; G01N 2201/06; G01N 2201/0634; G06T 7/90;
(Continued)

(56) References Cited

U.S. PATENT DOCUMENTS 6,108,082 A 8/2000 Pettipiece et al.
11,624,654 B1 * 4/2023 Wu ....................... G01J 3/2823 356/326
(Continued)

FOREIGN PATENT DOCUMENTS

EP 2944930 11/2015
EP 3054273 8/2016
(Continued)

OTHER PUBLICATIONS

Martin A Hunt et al., "Imaging tristimulus colorimeter for the evaluation of color in printed textiles", Jan. 1999, SPIE vol. 3652, pp. 118-127 (Year: 1999).*
(Continued)

*Primary Examiner* — Jonathan M Hansen

(57) ABSTRACT

The disclosure relates to an imaging system which is designed for two-dimensional, spatially resolved measurement of radiometric and/or photometric measured variables, for example the color coordinates of light emitted by a test object. An image sensor is provided for receiving a first part of the light and for generating a two-dimensional digital image of the light emission of the test object. A measuring unit receives a second part of the light and detects radiometric and/or photometric measured variables for different measuring spots or measuring angles. A computing unit transforms the image values of at least a few image points of the generated image, the transformation taking into account the measured variables detected for the measuring spots or measuring angles. The disclosure provides a system which is improved in relation to the prior art. For example,
(Continued)

determining the color coordinates when measuring displays with spatially inhomogeneous spectral emission is more precise than in the prior art. The disclosure comprises an imaging spectrometer which is able to determine the measured variables separately for each measuring spot or measuring angle. Alternatively, two or more measuring units can be provided, a measuring unit being associated with each measuring spot or measuring angle. The disclosure also relates to a method for two-dimensional, spatially resolved measurement of radiometric and/or photometric measured variables, for example the color coordinates of light, which uses such an imaging system.

25 Claims, 6 Drawing Sheets

(52) U.S. Cl.
CPC ................ *G01N 2201/0634* (2013.01); *G06T 2207/10024* (2013.01); *G06T 2207/20021* (2013.01)

(58) Field of Classification Search
CPC . G06T 2207/10024; G06T 2207/20021; G01J 3/0205; G01J 3/0218; G01J 3/0229; G01J 3/14; G01J 3/2823; G01J 3/506; G01J 3/524
See application file for complete search history.

(56) References Cited

U.S. PATENT DOCUMENTS

| | | | | |
|---|---|---|---|---|
| 2012/0044496 | A1* | 2/2012 | Wang | G01J 3/465 356/402 |
| 2017/0010153 | A1* | 1/2017 | Vezard | G01J 3/0291 |
| 2020/0378887 | A1* | 12/2020 | Teraoka | G01N 21/55 |
| 2021/0127046 | A1* | 4/2021 | Kamm | G01J 3/0248 |

FOREIGN PATENT DOCUMENTS

| | | |
|---|---|---|
| JP | 2007-158700 | 6/2007 |
| JP | 2010-271246 | 12/2010 |
| WO | WO 2015/182571 | 12/2015 |
| WO | WO 2023/283742 | 1/2023 |
| WO | WO 2023/118478 | 6/2023 |

OTHER PUBLICATIONS

Internationaler Recherchenbericht und Schriftlicher Bescheid [International Search Report and the Written Opinion] Dated Oct. 10, 2023 From the International Searching Authority Re. Application No. PCT/EP2022/087564 and Its Translation of Search Report Into English. (25 Pages).

Prüfungsbescheid [Examination Report] Dated Sep. 15, 2022 From the Deutsches Patent-und Markenamt [German Patent and Trademark Office] Re. Application No. 102021134569.3. (6 Pages).

Autronic-Melchers "Autronics-Melchers: Display—MesSystem ConoScope-88", Autronic-Melchers LCD Handels GmbH, XP093087268, Pressemitteilung-PresseBox, Story Box-ID: 27358, 4 P., Nov. 12, 2004.

Steinel et al. "Quality Control of AR/VR Near-Eye Displays: Goniometrics Vs. Advanced 2D Imaging Light Measurements", Optical Architectures for Displays and Sensing in Augmented, Virtual, and Mixed Reality (AR, VR, MR), Proceedings of the Spie, XP060140750, 11765: 117650Y-1-117650Y-7, Mar. 28, 2021.

* cited by examiner

COLORIMETRY METHOD AND SYSTEM

RELATED APPLICATIONS

This application is a Continuation of PCT Patent Application No. PCT/EP2022/087564 having International filing date of Dec. 22, 2022, which claims the benefit of priority of German Patent Application No. 10 2021 134 569.3 filed on Dec. 23, 2021. The contents of the above applications are all incorporated by reference as if fully set forth herein in their entirety.

FIELD OF THE DISCLOSURE

The disclosure relates to an imaging system which is designed for two-dimensional, spatially resolved measurement of radiometric and/or photometric measured variables, for example the color coordinates of light emitted by a test object. The disclosure also relates to a method for the two-dimensional, spatially resolved measurement of radiometric and/or photometric measured variables, for example the color coordinates of light.

BACKGROUND

The disclosure is in the field of imaging color measurement devices, such as those used for example in the display manufacturing industry for quality assurance.

Imaging colorimetry based inspection systems have proven successful in improving quality and reducing production costs for all types of flat panel displays such as LCD displays and LED displays. The testing applications comprise the color matrix displays of smartphones, tablets, laptops, monitors, televisions, etc. as test objects.

Key components of known display test environments are so-called imaging colorimeters (color-measuring-devices), which allow an accurate measurement of the visual performance of displays which corresponds to the human perception of brightness, color and spatial relationships. Powerful imaging color-measuring-devices can accurately measure the color and the luminance (brightness) of individual image points of a display as well as the overall uniformity of the display using a color image of the test object captured by an image sensor.

In a typical manufacturing process, the visual performance of a display is checked by automated inspection systems that use such imaging colorimeters. This has several advantages. Quantitative evaluation of display errors is possible, a higher inspection speed can be achieved, and most importantly, a simultaneous evaluation of the overall display quality, i.e. uniformity and color accuracy, is possible.

In general, spectrometers or filter colorimeters are used for the measurement of color coordinates (usually in the CIE standard valence system). Filter colorimeters are equipped with optical filters that correspond to the tristimulus values (XYZ coordinates) of the CIE standard valence system and measure chromaticity and luminance by detecting the intensity of the light passing through the optical filters. A spectrometer measures the color coordinates by splitting the light from the test object into wavelength components, e.g. using a prism, a diffraction grating or a spectral filter, and detecting the intensity of each primary wavelength element. The measured spectrum is then converted into color coordinates according to the sensitivity curves of the CIE standard valence system. A spectrometer is therefore able to accurately measure absolute chromaticity and luminance. However, spectrometers are rather not suitable as imaging test devices.

An imaging colorimetric system is known, for example, from U.S. Pat. No. 5,432,609. In the known system an optical filter is located, that transmits only certain wavelengths, in front of a monochrome CCD image sensor that receives the light from the test object. In this way, the color coordinates at the various points of the test object are measured with spatial resolution by a simple method based on the same principle as that of a filter colorimeter. In addition, a spectrometer is provided that receives the light from a predetermined measuring spot of the test object, i.e. without spatial resolution. This means that the color coordinates are accurately measured at the one measuring spot. The results of the spatially resolved measurement, which are output from the CCD image sensor, are finally corrected on the basis of the accurate but not spatially resolved spectral measurement.

The EP 3 054 273 A1 describes a colorimetry system for testing displays in which an RGB image sensor is used for spatially resolved measurement of the color coordinates. This allows fast and cost-effective testing in the production of matrix displays. The RGB image sensor assigns a set of RGB color values to each image point of the color image captured by the test object. However, the spectral channels (red, green, blue) of the RGB image sensor are very far from the color coordinates XYZ of the CIE standard valence system (CIE1931 standard), which must be determined in order to accurately assess the visual performance of the test object in accordance with human perception of brightness and color. Therefore, the RGB color values of the image points of the captured image are transformed into color coordinates. In general, the conversion of RGB color values into XYZ color coordinates is not possible because the XYZ color coordinates depend on the spectrum of the measured light deviating from the sensitivities of the RGB spectral channels, but the spectral information is no longer present in the RGB color image. However, for a set of "typical" test objects that emit light with a similar spectral distribution, a (linear) transformation can be found to convert the RGB color values into XYZ color coordinates. Any remaining deviation in the color coordinates obtained in this way is then corrected by measuring a second part of the emitted light from a measuring spot on the test object, i.e. without spatial resolution, by means of a spectrometer in parallel with the measurement using the RGB image sensor. The true color coordinates are derived from the spectrum measured for the measuring spot. Finally, on this basis, the color coordinates obtained by transforming the color image of the RGB image sensor are corrected accordingly for each image point. The resulting image of the corrected XYZ color coordinates is of sufficient accuracy for a number of applications, even if the "true" color coordinates are not measured with spatial resolution.

However, the known approach described above reaches its limits in practice when the spectral properties of the light emission are not homogeneous across the display surface. It has been shown, for example, that with OLED displays or μLED displays the error in the obtained color coordinates increases beyond a tolerable level with increasing distance from the measuring spot positioned centrally on the display (i.e. on the image sensor's detecting axis) (M. E. Becker et al., "Spectrometer-Enhanced Imaging Colorimetry", SID 2017, https://doi.org/10.1002/sdtp.11951). The reason for this is that the emission spectrum of OLED displays and uLED displays depends on the beam angle and light emitted further away from the center of the display is inevitably captured at an increasingly larger angle relative to the detecting axis of the image sensor used. Comparable problems exist with so-called virtual reality (VR) or augmented reality (AR) displays. For assessment of the quality of these displays, the combined observation optics (wide-angle optics, conoscope optics) must also be taken into account. Due to unavoidable chromatic aberration, spectral changes occur depending on the observation angle (T. Steinel et al., "Quality Control of AR/VR Near-Eye Displays: Goniometric vs. Advanced 2D Imaging Light Measurements", 2021). These lead to significant systematic errors in the color coordinates when applying the known measurement principle described above.

SUMMARY

The disclosure relates to an imaging system which is designed for two-dimensional, spatially resolved measurement of radiometric and/or photometric measured variables, for example the color coordinates of light emitted by a test object. An image sensor is provided for receiving a first part of the light and for generating a two-dimensional digital image of the light emission of the test object. A measuring unit receives a second part of the light and detects radiometric and/or photometric measured variables for different measuring spots or measuring angles. A computing unit transforms the image values of at least a few image points of the generated image, the transformation taking into account the measured variables detected for the measuring spots or measuring angles.

DETAILED DESCRIPTION OF THE EMBODIMENTS

Figure 1:
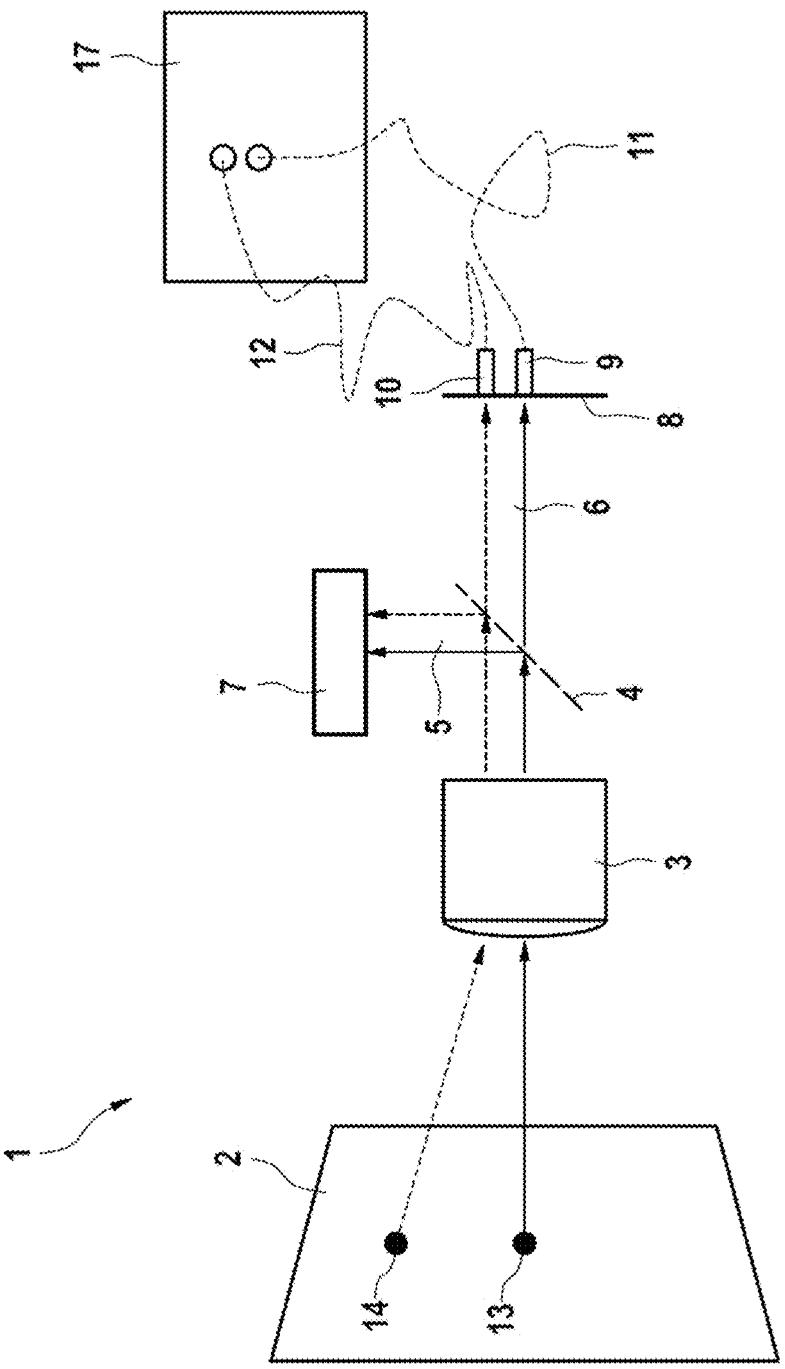
FIG. 1 shows a schematic representation of a first embodiment example of the colorimeter system with parallel detection of measuring spots.

The present disclosure relates to an imaging system according to claim 1. Hereby the measuring unit of the system comprises an imaging spectrometer and each measuring spot/measuring angle is assigned to a different image area of the imaging spectrometer, so that the imaging spectrometer is able to determine the measured variables separately for each measuring spot/measuring angle. Alternatively, two or more measuring units may be provided, whereby one measuring unit is assigned to each measuring spot/measuring angle.

The measuring unit or units may be one or more colorimeters.

A measuring spot is a limited area on the light-emitting surface of the test object.

A measuring angle is an angle in three-dimensional space (specified e.g. by polar angle and azimuth) at which the light is emitted from the surface of the test object, e.g. with respect to a surface normal of the test object or with respect to an optical axis of the system.

A transformation is any form of conversion or correction of the image values (i.e. the numerical values that describe the intensity with which the image points of the image sensor are each hit by the first part of the light, such as R, G and B values of an RGB image sensor), such as the conversion of RGB values into color coordinates in accordance with the CIE standard valence system or also the correction of color coordinates captured by means of an imaging filter wheel colorimeter using the (precise) captured measured variables recorded by means of the measuring unit or measuring units.

Furthermore, the disclosure proposes a method according to claim 10, for the two-dimensional, spatially resolved measurement of radiometric and/or photometric measured variables, for example the color coordinates of light emitted by a test object. The method uses the aforementioned imaging system.

In the imaging system of the disclosure, the splitting optic may comprise a beam splitter or a movable mirror. The beam splitter ensures that the first and the second part of the light are detected simultaneously by the image sensor or by the measuring unit/colorimeter. When using a movable mirror (e.g. by controllable actuator), the detection of the light takes place sequentially or alternately by the image sensor or colorimeter. The mirror directs the incident light alternately onto the image sensor (first part) and the colorimeter (second part).

According to a variant of the disclosure, the system comprises an imaging spectrometer (e.g. in the form of a hyperspectral camera), wherein each measuring spot or measuring angle is assigned to a different image area of the imaging spectrometer, so that the spectrometer is able to simultaneously capture a spectrum separately for each measuring spot or measuring angle and to determine the measured variables.

In one possible configuration, the imaging spectrometer has an entrance slit, whereby two or more optical fibers are provided, each of which is assigned to a different measuring spot or measuring angle and the light emitted from the respective measuring spot or under the respective measuring angle leads to a different position on the entrance slit.

Hereby the imaging spectrometer may comprise a dispersive optical element, e.g. a grating or a prism, and a further image sensor. The further image sensor may have a matrix-shaped design with a number of image lines, whereby the supply of light from the individual measuring spots/measuring angles to different positions on the entrance slit causes that respectively one or more image lines are assigned to a measuring spot/measuring angle as an image area, whereby the spectrum, i.e. the wavelength or frequency dimension, is resolved by the dispersive optical element along the image lines. Since the measuring spots/measuring angles are thus assigned to different image lines and the image lines each reproduce a spectrum, the spectrometer is able to determine a spectrum separately for each measuring spot/measuring angle and thus (per computing unit) the color coordinates.

In a further possible embodiment, a perforated mask defining the measuring spots/measuring angles is provided in the beam path of the second part of the incident light. The perforated mask is arranged, for example, in a collimated beam of the second part of the incident light, whereby each of a plurality of holes in the perforated mask corresponds to a measuring spot/measuring angle. This means that the spatial arrangement of the holes determines the positions of the measuring spots on the test object or the measuring angles under which the emission has occurred. The dispersive element causes a spatial separation of the wavelength components on the image sensor for each measuring spot/measuring angle. This means that by analyzing the output of the image sensor, a spectrum can be captured for each measuring spot/measuring angle. From this, in turn, the color coordinates for each measuring spot/measuring angle can be derived using the calculation unit.

Similar to the prior art, according to the disclosure, the light incident from the test object is split (by splitting optic), whereby one part of the light is fed to the image sensor and the other part to the measuring unit, e.g. the colorimeter. By means of a computing unit (e.g. computer), the image values of the image supplied by the image sensor are transformed, e.g. converted into color coordinates.

According to the disclosure, the radio-, photo- or colorimetric measurement is not carried out for just one measuring spot on the test object, as in the prior art, but for several measuring spots, which are located at different positions on the test object, or for several measuring angles. For each measuring spot/measuring angle the measured variables, e.g. the "true" color coordinates for the light emitted by the measuring spot/measuring angle, are measured separately. For each measuring spot/measuring angle there is thus an individual set of precise measurement variables (e.g. color coordinates), which are taken into account when transforming the image values obtained by the image sensor. Consequently, spectral properties of the light emission that vary over the surface of the test object can be taken into account during the transformation-unlike in the prior art. For example, the color coordinates obtained are correspondingly more precise and, for example, less subject to systematic errors depending on the angle of radiation.

The color coordinates are for example XYZ color coordinates (tristimulus values) in the CIE standard valence system or coordinates derived from them, such as the x-y chromaticity coordinates or Lu'v' coordinates in the CIE LUV color space system. The indication of the so-called dominant wavelength or the color temperature may also be included in the color coordinates. In any case, the notion of color coordinates stands for colorimetric indication for the quantification of physiological color perception, while the notion of color values of the image sensor stands for indications in a color system which differs therefrom according to the spectral properties (spectral channels) of the image sensor (e.g. RGB). The color coordinates are the relevant quantities for the quality assessment of the test objects (e.g. matrix displays).

In one possible configuration, the system has a conoscopic optic designed to image the light emitted from an area on the test object under different angles onto the image sensor in such a way that each image point of the two-dimensional digital image is associated with a different emission angle. In this configuration, the second part of the light can be received particularly easily by the measuring unit or measuring units in such a way that the radiometric and/or photometric measured variables, for example the color coordinates of the emitted light, are recorded for individual measuring angles.

In one possible configuration, the transformation of the image values into color coordinates takes place in two steps:

i) Transforming the image values into color coordinates on the basis of a transformation rule determined in advance by calibration, ii) Correction of the color coordinates obtained in step i), whereby the correction is derived from a comparison of the color coordinates obtained in step i) with the color coordinates captured for the measuring spots.

Thus, similar to the prior art mentioned above (EP 3 054 273 A1), a transformation rule is determined in advance by calibration, e.g. by measuring a number of reference objects, e.g. in the form of a transformation matrix which converts the color value vector for each image point of the image of the image sensor into a vector of color coordinates. During the measurement of the actual test objects, the image values of the image generated by the image sensor are first transformed into color coordinates based on the transformation matrix. These "raw values" are then corrected on the basis of the color coordinates captured in parallel from the test object for the measuring spots/measuring angles. In contrast to the prior art, according to the disclosure, the correction is made not only on the basis of the color coordinates captured for one measuring spot, but on the basis of color coordinates captured for two or more measuring spots positioned at different positions on the test object or at different measuring angles. Thereby the errors are reduced that have so far occurred due to spatially inhomogeneous emission.

In one possible configuration, the correction comprises dividing the image into spatially separate zones, wherein each zone is assigned a measuring spot/measuring angle and wherein the correction for each zone is derived from a comparison of the color coordinates within this zone obtained in step i) with the color coordinates captured for the measuring spot/measuring angle assigned to this zone. By assigning a measuring spot/measuring angle to each zone, the correction resulting from this measuring spot/measuring angle is applied specifically to those image points which are located in the same zone, i.e. in the vicinity of the measuring spot/measuring angle in question. This directly takes into account the spatial deviations of the light emission, assuming that the variation of the light emission is spatially continuous, e.g. in the form of a spectral shift that continuously increases with increasing distance from the optical axis.

In one possible configuration, the correction of the color coordinates applies an interpolation according to the positions of the measuring spots/measuring angles within the image. The interpolation (e.g. linear or cubic) provides further improved precision with continuous variation of the emission properties over the surface of the test object. It is also possible to work with a (mathematical) model of the emission properties of the test object if, for example, test objects are to be measured that have a characteristic behavior of light emission (e.g. depending on the viewing angle). The model can then be parameterized using the color coordinates captured for the measuring spots/measuring angles and used for the correction of the color coordinates captured using the transformation rule for all image points.

In an alternative configuration, the transformation of the image values of the image of the image sensor takes place on the basis of a transformation rule that is derived from the image values of the digital image captured by the test object and the color coordinates captured by the same test object for the measuring spots/measuring angles. This procedure does not require prior calibration because the transformation rule can be determined "in situ", by means of the image values captured simultaneously by the image sensor (in the color system of the image captured by the image sensor) and the color coordinates captured by the colorimeter (in the desired color system, e.g. in the CIE standard valence system) for the measuring spots/measuring angles. With a sufficient number of measuring spots/measuring angles, it can be ensured for example that sufficient data is available for solving the inverse problem to find the correct transformation rule (e.g. as a transformation matrix). Hereby the number of measuring spots/measuring angles should be at least equal to the number of spectral channels of the image sensor used. This is not possible with just one measuring spot (as in the prior art). This configuration on the one hand, does not require (time-consuming) pre-calibration and, at the same time, takes into account the inhomogeneous emission properties of the test object and thus ensures improved precision of the determined color coordinates compared to the state of the art. This design is "self-calibrating", so to speak.

In one possible configuration, the image comprises at least three, for example at least five, for example at least nine image values for each image point. In practice, three spectral channels of a common RGB image sensor prove to be insufficient for some applications in order to enable precise conversion of the image values of the image into color coordinates. The reason for this is simply that too much spectral information is lost with only three color channels. With more spectral channels, precision can be significantly improved. An image sensor (such as a multispectral camera) with nine (or more) spectral channels proves to be particularly suitable.

In another possible configuration, the measuring spots on the test object are located at different radial distances from the image sensor's detecting axis. This arrangement of the measuring spots takes account of the fact that in some display types that are suitable as test objects (e.g. OLED displays), the spectral shift of the emission depends on the viewing angle, i.e. the distance of the emission location from the center of the display where the image sensor's detecting axis intersects the display surface.

DETAILED DESCRIPTION OF THE DRAWINGS

Embodiment examples of the disclosure are explained in more detail below with reference to the drawings.

In the drawings, identical elements are designated with identical reference numbers. The same terms are used for identical elements in the following description.

In the drawings, the imaging colorimeter system according to the disclosure is designated as a whole by the reference number 1.

The imaging system 1 of FIG. 1 comprises an objective 3 that collimates light emitted by a test object, namely a matrix display 2 (e.g. OLED display). Downstream of the objective 3 in the beam path is a beam splitter 4 as splitting optic. The beam splitter 4 splits the light coming from the matrix display 3 into a first part 5 and a second part 6. An image sensor 7, e.g. an RGB image sensor or an imaging filter wheel colorimeter with monochrome image sensor, receives the first part 5 of the light and generates a two-dimensional digital image (colorimage) of the light emission from the matrix display 2. The image output by the image sensor 7 is transmitted to a computer (not shown) connected to the image sensor 7. Two coupling units 9, 10 of light-conducting fibers 11 and 12 are arranged in a common plane 8 within the beam cross-section of the second part 6 of the light. The light is coupled into the fibers 11 and 12 accordingly at the positions at which the two coupling units are located. In this way it is achieved that the light propagating in the fiber 11 originates from a first measuring spot 13 and the light propagating in the fiber 12 originates from a second measuring spot 14 on the matrix display 2. The positions of the coupling units 9, 10 in the plane 8 determine the positions of the measuring spots 13, 14 on the matrix display 2. As can be clearly seen in FIG. 1, the two measuring spots 13, 14 differ from each other in terms of the beam angle under which the light emitted from the corresponding positions on the matrix display 2 is detected by the objective 3. An imaging spectrometer 17 (hyperspectral camera) is used as measuring unit (colorimeter). The two fibers 11, 12 lead to different (vertical) positions on the entrance slit of the imaging spectrometer 17, so that each measuring spot 13, 14 is assigned to a different image area of the imaging spectrometer. Thus, the spectrometer 17 (or the computer connected to it) is able to capture a spectrum separately for each measuring spot 13, 14 and to determine the color coordinates from it in each case. The imaging spectrometer 17 is also connected to the computer. The computer has a programming by which the image values of the image points of the image, which is output by the image sensor 7, are transformed into color coordinates in the CIE standard valence system. The color coordinates precisely captured by the spectrometer for the measuring spots 13, 14 are taken into account as a reference.

Figure 2:
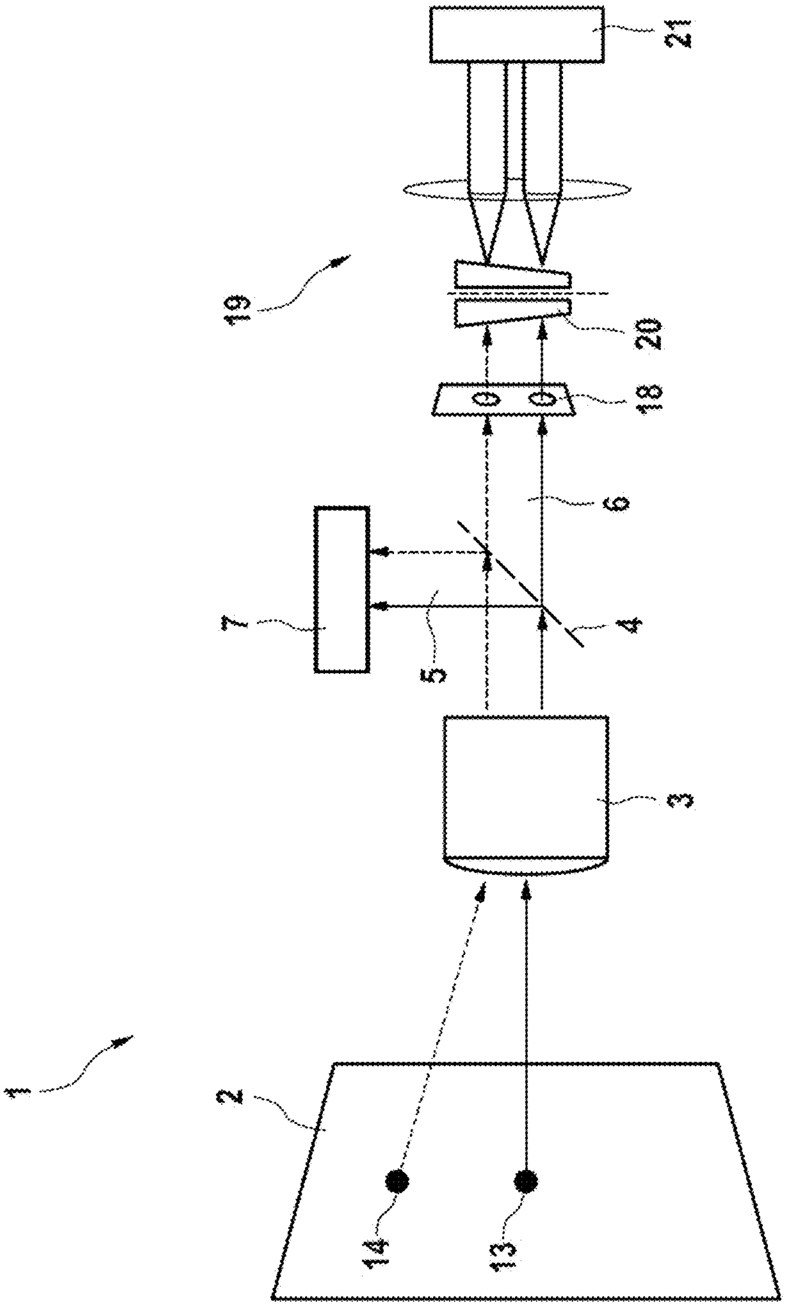
FIG. 2 shows a schematic representation of a second embodiment example of the colorimeter system with parallel detection of measuring spots.
Figure 3:
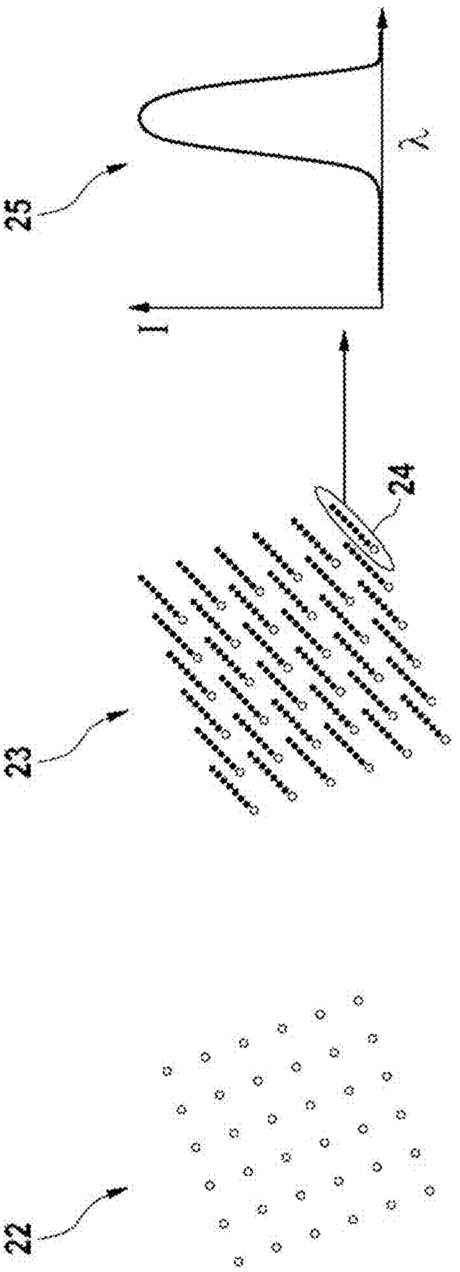
FIG. 3 shows an illustration of the spectral detection of measuring spots in the second embodiment example per GRISM.

In the embodiment example of FIG. 2, a perforated mask 18 defining the measuring spots 13, 14 is provided, which is arranged in the beam path of the second part 6 of the light, whereby the measuring unit, here the colorimeter 19, comprises a spectrometer with a dispersive optical element 20, here a so-called GRISM, i.e. a prime grating prism arrangement, and a further image sensor 21. Each of the holes of the perforated mask corresponds to a measuring spot 13, 14. I.e. the spatial arrangement of the holes determines the positions of the measuring spots 13, 14 on the matrix display 2. FIG. 3 illustrates the operating principle of the colorimeter 19. Drawing 22 in FIG. 3 shows an exemplary hole pattern of the perforated mask 18. The dispersive element 20 causes a spatial separation of the wavelength components on the image sensor 21 for each measuring spot, as illustrated in drawing 23 in FIG. 3. The spatial separation of the wavelength components for the rightmost measuring spot, for example, is marked at 24. By analyze of the output of the image sensor 21, a spectrum can be captured for each measuring spot accordingly, as shown in drawing 25. From this, in turn, the color coordinates for the relevant measuring spot can then be derived using the computer.

Figure 4:
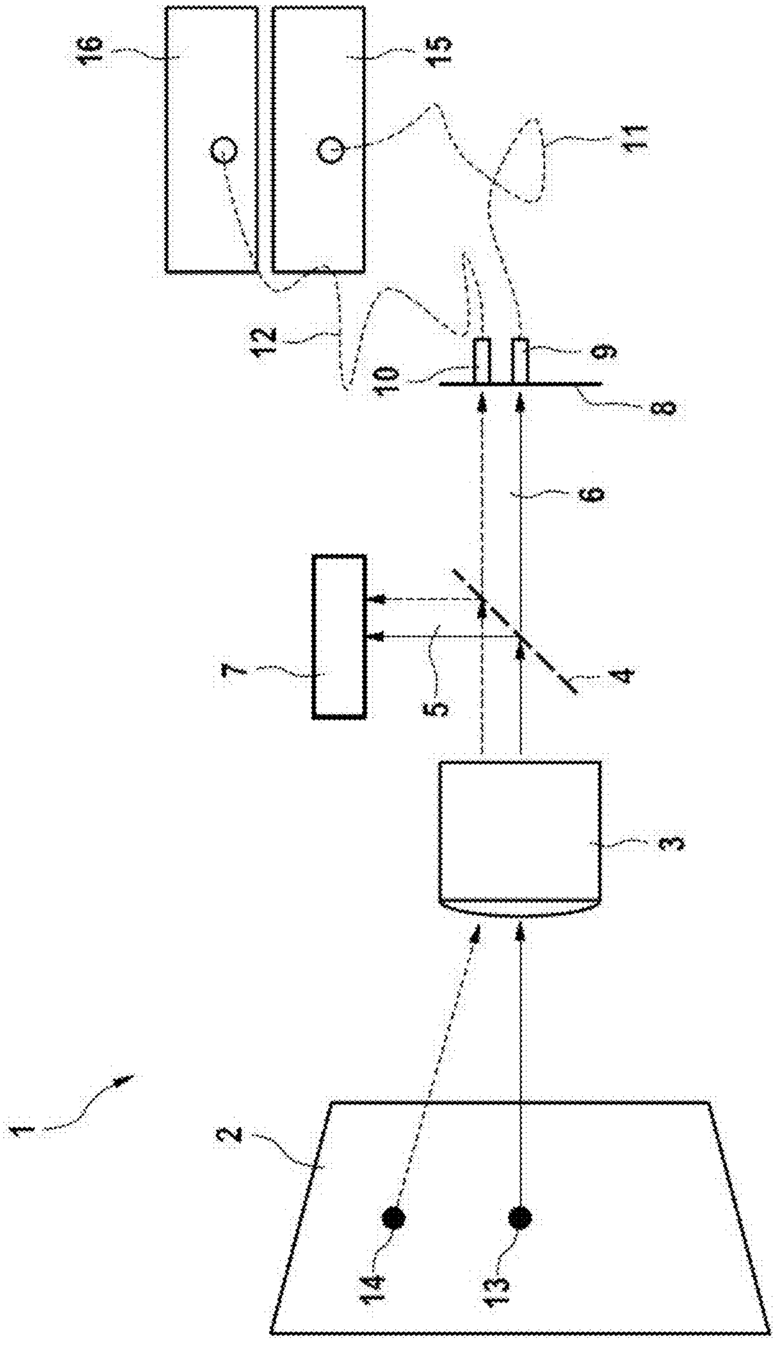
FIG. 4 shows a schematic representation of a third embodiment example of the colorimeter system with parallel detection of measuring spots.

In the embodiment example of FIG. 4, the light emitted by the measuring spots 13, 14 via the two fibers 11, 12 is fed to two separate colorimeters 15, 16, for example conventional filter colorimeters, as measuring units. Accordingly, the colorimeters 15, 16 detect the color coordinates of the emitted light separately for each of the two measuring spots 13, 14. The two colorimeters 15, 16 are connected to the computer. The computer has a programming by which the image values of the image points of the image, which is output by the image sensor 7, are transformed into color coordinates in the CIE standard valence system. Hereby the color coordinates precisely captured by colorimeters 15, 16 for the measuring spots 13, 14 are taken into account as a reference.

It should be noted that the embodiment examples in FIGS. 1, 2 and 4 each show only two measuring spots 13, 14 as examples for reasons of clarity. The presentation serves only to explain the principle in each case. The embodiment examples can easily be extended to a larger number of measuring spots (e.g. three, five, nine or more) in a completely analogous manner. FIG. 3 illustrates, also by way of example only, an embodiment with a total of 36 measuring spots.

In a possible not represented variant of the embodiments shown in FIGS. 1, 2 and 4, the objective 3 may be a conoscopic objective, which is designed to image the light emitted from a limited (possibly approximately point-shaped) area on the test object 2 under different angles onto the image sensor 7 in such a way that each image point of the two-dimensional digital image is assigned a spatial emission angle (e.g. given by the polar angle and the azimuth of the radiation). This makes it possible to precisely measure the angle-dependent radiation characteristics of the test object 2. In the variant of FIG. 1, but with conoscopic objective 3, with coupling units 9, 10 of the light-conducting fibers 11 and 12 arranged in the common plane 8 within the beam cross-section, the positions at which the two coupling units 9, 10 are located determine the (two) measuring angles under which the light is emitted by the matrix display 2. In the correspondingly modified variant of FIG. 2, the spatial arrangement of the holes in the perforated mask 18 determines the (here two) measuring angles.

Figure 5:
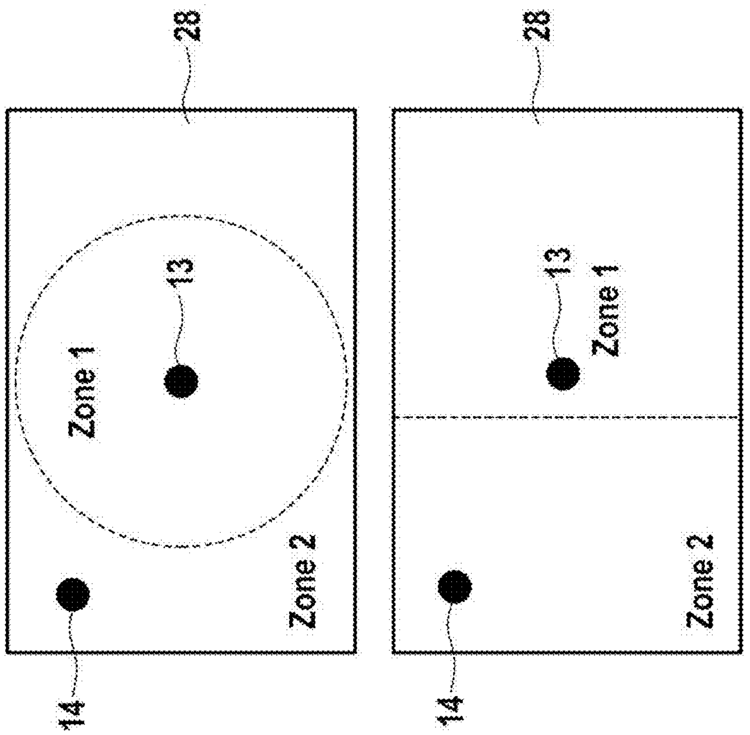
FIG. 5 shows an illustration of the assignment of zones to measuring spots when correcting color coordinates.

As explained above, the transformation of the image values of the image sensor 7 into CIE color coordinates may be carried out on the basis of a calibration carried out in advance with subsequent correction using the color coordinates determined for the measuring spots 13, 14, similar to that described in the cited EP 3 054 273 A1. By calibration, a transformation rule is determined once in advance, e.g. in the form of a transformation matrix, which converts the image value vector for each image point of the image of the image sensor 7 into a vector of color coordinates. During the actual measurement of the test object, i.e. the matrix display 2, the image values of the image generated by the image sensor 7 are first transformed into color coordinates on the basis of the transformation matrix, i.e. on the basis of the calibration carried out. A correction is then made using the color coordinates captured in parallel by the matrix display 2 for the measuring spots 13, 14. FIG. 5 illustrates that the correction may include dividing the image 28 into spatially separate zones (zone 1, zone 2), whereby each zone is assigned a measuring spot 13, 14. The correction is derived for each zone from a comparison of the color coordinates within that zone previously obtained by transformation on the basis of the calibration with the color coordinates detected for the measuring spot 13, 14 assigned to this zone. The correction may, for example, be a simple scaling of the individual color coordinates X, Y and Z, corresponding to the ratio of the color coordinates initially obtained by transformation matrix for the positions of the measuring spots 13, 14 and the color coordinates precisely recorded by colorimeter 15, 16, 17, 19 for the respective corresponding measuring spot 13, 14. This correction is then applied to all color coordinates obtained by transformation within the relevant zone. FIG. 5 shows two possible variants for subdivision into zones. The subdivision is appropriately selected according to the course of change of the light emission over the surface of the matrix display 2.

As an alternative to the correction method described above, the transformation of the image values of the image of the image sensor 7 may be performed on the basis of a transformation rule which is derived from the image values of the digital image captured by the matrix display 2 and the color coordinates captured by the same matrix display 2 (in parallel or sequentially) for the measuring spots 13, 14 per colorimeter 15, 16, 17, 19. The transformation rule is determined "in situ" on the basis of the image values captured for the measuring spots 13, 14 by image sensor 7 and also the color coordinates captured by colorimeters 15, 16, 17, 19.

This principle is explained below with reference to FIG. 6. In the example in FIG. 6, an image sensor 7 with nine spectral channels is used (as in a multispectral camera). The diagram 29 illustrates the sensitivities of the nine spectral channels of the image sensor 7. Drawing 30 shows a top view of the matrix display 2 to be measured with a number of nine measuring spots located on it at nine different distances $R_1$-$R_9$ from the center of the matrix display 2. The XYZ color coordinates of the light emission are precisely recorded in parallel or sequentially for all of the measuring spots per colorimeters 15, 16, 17, 19. The diagram 31 shows the spectra of the light emission at the various measuring spots with increasing distance (arrow direction) from the center of the matrix display 2. The distance-dependent shift of the emission spectrum can be clearly seen. This results in nine sets of XYZ color coordinates for the nine measuring spots:

$$XYZ = \begin{pmatrix} X_1 & Y_1 & Z_1 \\ X_2 & Y_2 & Z_2 \\ & \vdots & \\ X_9 & Y_9 & Z_9 \end{pmatrix}$$

The measurement using the multispectral image sensor 7 results in nine image values for each of the nine measuring spots corresponding to the nine spectral channels of the image sensor 7:

$$C = \begin{pmatrix} C_{1,1} & \dots & C_{1,9} \\ \vdots & \ddots & \vdots \\ C_{9,1} & \dots & C_{9,9} \end{pmatrix}$$

The 9×3 matrix of the XYZ color coordinates is linked to the 9×9 matrix of the image values via the required transformation rule (hereinafter referred to as matrix CCM):

$$XYZ = CCM * C$$

The transformation rule CCM can be determined by numerically solving the inverse problem using the computer in real time (for example, based on the known method of minimizing the deviation squares or using other known algorithms). With a sufficient number of measuring spots (here at least nine, corresponding to the number of spectral channels of the image sensor 7), it can be ensured that sufficient data is available for solving the inverse problem to find the correct transformation rule CCM. This procedure for transforming the image values of the image sensor 7 into CIE color coordinates, taking into account the color coordinates recorded directly colorimetrically for the measuring spots, does not require prior calibration and also automatically takes into account inhomogeneous emission properties of the measured matrix display 2.

Figure 6:
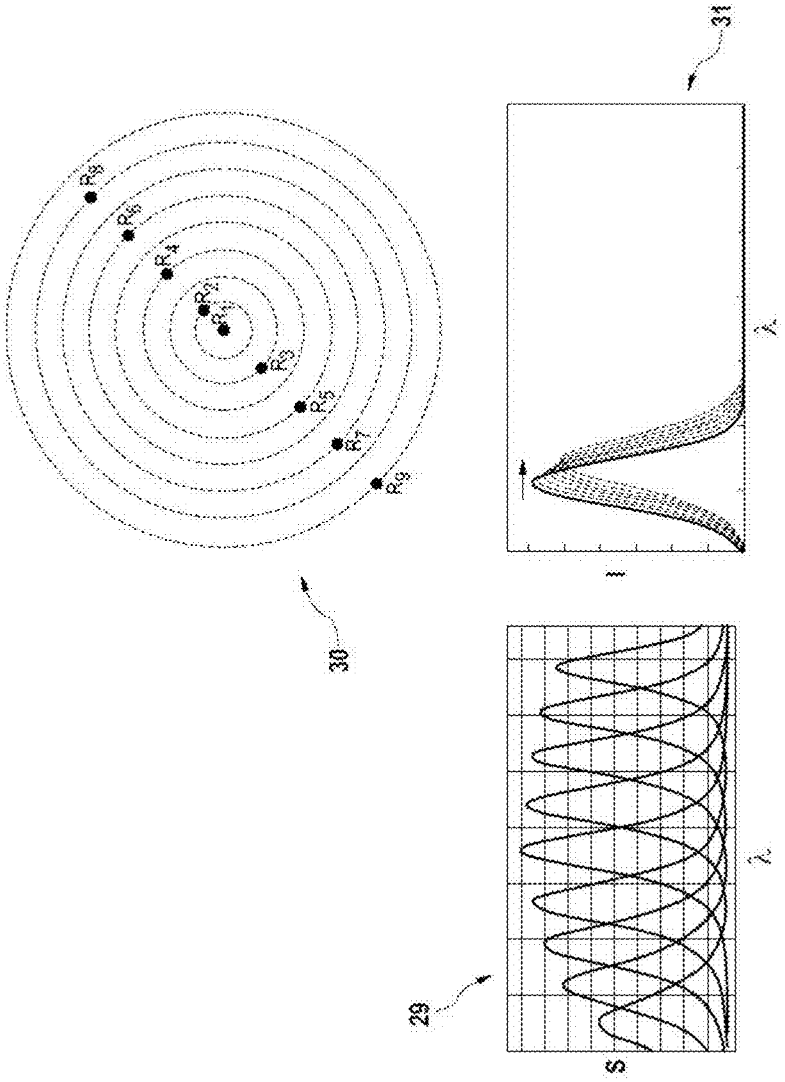
FIG. 6 shows an illustration of the determination of color coordinates by means of an image sensor of a multispectral camera using a plurality of colorimetrically recorded measuring spots.

It should be noted that the approach described in FIG. 6 is not dependent on the use of a multispectral image sensor 7. The same method can also be used analogously, for example, with an RGB image sensor 7 or an imaging filter wheel colorimeter with a monochrome image sensor that only has three spectral channels. A minimum of three measuring spots is then sufficient to determine the CCM transformation rule. A number of measuring spots that is even greater than the number of spectral channels can for example be used in order to determine the CCM transformation rule numerically with greater accuracy. The inverse problem to be solved is then overdetermined.

It is also conceivable to use, for example, an RGB image sensor 7 in combination with the arrangement of the measuring spots as shown in drawing 30 in FIG. 6. Hereby the number of measuring spots is significantly greater than the number of spectral channels of the image sensor 7. In this case, a transformation rule may be derived for different spatial areas of the test object, i.e. the matrix display 2, without prior calibration. For example, a transformation rule $CCM_1$ may be derived from the measuring spots at the distances $R_1$, $R_2$, $R_3$, a transformation rule $CCM_2$ from the measuring spots at the distances $R_2$, $R_3$, $R_4$, a transformation rule $CCM_3$ from the measuring spots at the distances $R_3$, $R_4$, $R_5$ and so on. These transformation rules are then applied to transform the RGB image values into color coordinates for the image points in the various areas, i.e. here in the ring-shaped areas determined by the corresponding distances $R_1$ to $R_9$ from the center.

The disclosure provides an improved system and a corresponding method compared to the state of the art. For example, the determination of the color coordinates in the measurement of displays with spatially inhomogeneous spectral emission is more precise and/or extended compared to the prior art.

What is claimed is:

1. An imaging system which is designed for two-dimensional, spatially resolved measurement of radiometric and/or photometric measured variables of light which is emitted by a test object, comprising:

a splitting optic provided to split the light incident from the test object into at least a first part and at least a second part, wherein the second part comprises light which is emitted from two or more measuring spots on the test object or which is emitted from the test object under two or more measuring angles, an image sensor provided to receive the first part of the light and to generate a two-dimensional digital image of the light emission of the test object, at least one measuring unit, provided to receive the second part of the light and to detect radiometric and/or photometric measured variables of the emitted light separately for each measuring spot or each measuring angle; and a processor provided to transform the image values of at least a portion of the image points of the two-dimensional digital image, wherein the transformation takes into account the radiometric and/or photometric measured variables detected for the measuring spots or measuring angles, wherein the at least one measuring unit comprises an imaging spectrometer and each measuring spot or measuring angle is assigned to a different image area of the imaging spectrometer, so that the imaging spectrometer is able to determine the measured variables separately for each measuring spot or measuring angle, or two or more measuring units are provided, wherein a measuring unit is assigned to each measuring spot or measuring angle.

2. The imaging system according to claim 1, wherein the measuring unit/or measuring units is a colorimeter/or are colorimeters.

3. The imaging system according to claim 1, wherein the imaging spectrometer has an entrance slit, wherein two or more optical fibers are provided, each of which is associated with a different measuring spot or measuring angle, and wherein the light emitted from the respective measuring spot or under the respective measuring angle leads to a different position on the entrance slit.

4. The imaging system according to claim 1, wherein the imaging spectrometer comprises a dispersive optical element and a further image sensor.

5. The imaging system according to claim 4, wherein a perforated mask defining the measuring spots or measuring angles is provided being arranged in the beam path of the second part of the incident light.

6. The imaging system according to claim 1, wherein the splitting optic comprises a beam splitter or a movable mirror.

7. The imaging system according to claim 1, wherein the image sensor has more than three spectral channels.

8. The imaging system according to claim 7, wherein the number of measuring spots or measuring angles is at least equal to the number of spectral channels of the image sensor.

9. The imaging system according to claim 1, wherein the system comprises a conoscopic optic which is provided to image the light emitted from an area on the test object under different angles onto the image sensor in such a way that a different emission angle is associated with each image point of the two-dimensional digital image.

10. A method for two-dimensional, spatially resolved measurement of radiometric and/or photometric measured variables of light which is emitted by a test object, using an imaging system according to claim 1, comprising the steps of:

directing at least a first part of the light onto the image sensor, which generates a two-dimensional digital image of the light emission of the test object, directing at least a second part of the light, which is emitted from two or more measuring spots on the test object or which is emitted from the test object under two or more measuring angles, onto the at least one measuring unit, and detecting radiometric and/or photometric measured variables, of the emitted light separately for each measuring spot or each measuring angle; and transforming the image values of at least a portion of the image points of the two-dimensional digital image, wherein the transformation takes into account the measured variables detected for the measuring spots or measuring angles.

11. The method according to claim 10, wherein the transformation of the image values into color coordinates takes place in two steps:

i) transforming the image values into color coordinates on the basis of a transformation rule determined in advance by calibration; and ii) correction of the color coordinates obtained in step i), wherein the correction is derived from a comparison of the color coordinates obtained in step i) with the color coordinates detected for the measuring spots or measuring angles.

12. The method according to claim 11, wherein the correction comprises dividing the two-dimensional digital image into spatially separate zones, wherein each zone is assigned to a different measuring spot or a different measuring angle, and wherein the correction for each zone is derived from a comparison of the color coordinates obtained in step i) within that zone with the color coordinates detected for the measuring spot or measuring angle assigned to that zone.

13. The method according to claim 11, wherein the correction applies an interpolation corresponding to the positions of the measuring spots or measuring angles within the two-dimensional digital image.

14. The method according to claim 11, wherein the transformation of the image values is based on a transformation rule derived from the image values of the digital image captured by the test object and the color coordinates captured by the same test object for the measuring spots or measuring angles.

15. The method according to claim 10, wherein the transformation of the image values takes place on the basis of a transformation rule which is derived from the image values of the digital image captured by the test object and the measured variables captured by the same test object for the measuring spots or measuring angles, wherein the transformation rule is derived without prior calibration.

16. The method according to claim 10, wherein the two-dimensional digital image comprises at least three image values for each image point.

17. The method according to claim 10, wherein the measuring spots on the test object are located at different radial distances from the detecting axis of the image sensor.

18. The method according to claim 10, wherein the measured variables for the two or more measuring spots or measuring angles are detected simultaneously.

19. The method according to claim 11, wherein the color system of the color coordinates and the color system of the image values of the two-dimensional digital image generated by the image sensor differ from each other.

20. The method according to claim 19, wherein the color system of the color coordinates is the CIE standard valence system.

21. The method according to claim 19, wherein the color system of the image values of the two-dimensional digital image is the RGB color system or a color system corresponding to three or more spectral channels of the image sensor.

22. The method according to claim 10, wherein the measuring spots are positioned spaced apart from each other within the detecting area of the image sensor on the test object.

23. The method according to claim 10, wherein the number of measuring spots or measuring angles is at least three, and wherein the number of measuring spots or measuring angles is at least equal to the number of spectral channels of the image sensor.

24. The imaging system according to claim 7, wherein the image sensor has at least five spectral channels.

25. The imaging system according to claim 24, wherein the image sensor has at least nine spectral channels.

* * * * *